United States Patent
Buendgen et al.

(10) Patent No.: US 11,240,106 B2
(45) Date of Patent: Feb. 1, 2022

(54) PROVIDING BACKUP AND RESTORE SERVICES TO NETWORK ATTACHED APPLIANCES IN A NETWORK

(71) Applicant: International Business Machines Corporation, Armonk, NY (US)

(72) Inventors: Reinhard T. Buendgen, Tuebingen (DE); Joerg Mueller, Ihlingerstrasse (DE); Thomas Prause, Rottenburg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

(21) Appl. No.: 16/672,389

(22) Filed: Nov. 1, 2019

(65) Prior Publication Data
US 2020/0067775 A1    Feb. 27, 2020

Related U.S. Application Data

(62) Division of application No. 15/164,840, filed on May 25, 2016, now Pat. No. 10,498,603.

(51) Int. Cl.
*G06F 16/00* (2019.01)
*H04L 12/24* (2006.01)
(Continued)

(52) U.S. Cl.
CPC ...... *H04L 41/0856* (2013.01); *G06F 11/1451* (2013.01); *G06F 11/1464* (2013.01);
(Continued)

(58) Field of Classification Search
CPC ............. H04L 41/0856; H04L 67/1097; G06F 11/1451; G06F 11/1464; G06F 11/1469; G06F 2201/835; G06F 2201/84
See application file for complete search history.

(56) References Cited

U.S. PATENT DOCUMENTS 6,715,075 B1    3/2004  Loukianov
7,346,435 B2    3/2008  Amendola et al.
(Continued)

FOREIGN PATENT DOCUMENTS

CN    201796366    4/2011
WO    2013129529   9/2013

OTHER PUBLICATIONS

Wikipedia, "Internet of Things", (online) retrieved from the Internet on Apr. 9, 2016, at URL> https://en.wikipedia.org/w/index.php?title=Internet_of_Things&printable=yes . . . , Total 20 pages.

(Continued)

*Primary Examiner* — Hung Q Pham
(74) *Attorney, Agent, or Firm* — Konrad Raynes Davda & Victor LLP; David W. Victor

(57) ABSTRACT

Provided are a computer program product, system, and method for providing backup and restore services to network attached appliances in a network. Configuration settings comprising configuration settings used in a network attached appliance are gathered and a unique identifier for the network attached appliance is determined. A backup request is generated including the configuration settings, the unique identifier, and a backup operation code. The backup request is broadcasted on the network to be received by the backup servers to store the configuration settings for the unique identifier.

12 Claims, 6 Drawing Sheets

(51) Int. Cl.
*G06F 11/14* (2006.01)
*H04L 29/08* (2006.01)

(52) U.S. Cl.
CPC ...... *G06F 11/1469* (2013.01); *H04L 67/1097* (2013.01); *G06F 2201/835* (2013.01); *G06F 2201/84* (2013.01)

(56) References Cited

U.S. PATENT DOCUMENTS

| | | | | |
|---|---|---|---|---|
| 8,065,561 | B1* | 11/2011 | Vaikar | G06F 11/1415 714/15 |
| 2008/0005380 | A1* | 1/2008 | Kawasaki | G06F 11/1458 710/15 |
| 2009/0012966 | A1* | 1/2009 | Arai | H04L 41/082 |
| 2010/0228836 | A1 | 9/2010 | Lehtovirta et al. | |

OTHER PUBLICATIONS

Machine Translation of CN 201796366, Published Total 7 pages.
"Managing Configuration Guide", dated Feb. 27, 2015, SRA E-Class OS 11.1—Administration Guide, (online), retrieved from the Internet at URL>http://documents.software.dell.com/sraeclassos/11.1/administrationguide/introduction/systemadministration/managingconfigurationdata?ParentProduct=. . . , Total 10 pages.
"Mergepoint Unity® Switch" Installer/User Guide, dated 2009, Avocent Corporation, Total 97 pages.
Machine Translation of WO2013129529, 8 pages.
Us Patent Application, dated May 25, 2016, for U.S. Appl. No. 15/164,840 (37.354) filed May 25, 2016, invented by Reinhard Buendgen , Total 33 pages.
Office Action, dated Nov. 13, 2018, for U.S. Appl. No. 15/164,840 (37.354) filed May 25, 2016, invented by Reinhard Buendgen , Total 11 pages.
Response to Office Action, dated Feb. 13, 2019, for U.S. Appl. No. 15/164,840 (37.354) filed May 25, 2016, invented by Reinhard Buendgen , Total 13 pages.
Final Office Action1, dated Apr. 12, 2019, for U.S. Appl. No. 15/164,840 (37.354) filed May 25, 2016, invented by Reinhard Buendgen , Total 10 pages.
Response to Final Office Action, dated Jun. 13, 2019, for U.S. Appl. No. 15/164,840 (37.354) filed May 25, 2016, invented by Reinhard Buendgen , Total 10 pages.
Advisory Action, dated Jun. 24, 2019, for U.S. Appl. No. 15/164,840 (37.354) filed May 25, 2016, invented by Reinhard Buendgen , Total 9 pages.
Response to Advisory Action, dated Jun. 24, 2019, for U.S. Appl. No. 15/164,840 (37.354) filed May 25, 2016, invented by Reinhard Buendgen , Total 9 pages.
Notice Allowance, dated Jul. 25, 2019, for U.S. Appl. No. 15/164,840 (37.354) filed May 25, 2016, invented by Reinhard Buendgen , Total 8 pages.
List of Patents and Applications Treated as Related, dated Nov. 1, 2019, Total 2 pages.

* cited by examiner

Configuration Setting Entry

Backup/Restore Request

Restore Reply

PROVIDING BACKUP AND RESTORE SERVICES TO NETWORK ATTACHED APPLIANCES IN A NETWORK

BACKGROUND OF THE INVENTION

1. Field of the Invention

The present invention relates to a computer program product, system, and method for providing backup and restore services to network attached appliances in a network.

2. Description of the Related Art

The Internet of Things comprises a network of physical objects embedded with electronics and network connectivity to communicate on a network, such as the Internet. Appliances within the Internet of Things are often manually configured with configuration settings. Over time, users may forget the specific configuration settings and the configuration process for these specialized appliances.

There is a need in the art for improved techniques to provide configuration settings network attached appliances and devices that are part of the Internet of Things.

SUMMARY

Provided are a computer program product, system, and method for providing backup and restore services to network attached appliances in a network. Configuration settings comprising configuration settings used in a network attached appliance are gathered and a unique identifier for the network attached appliance is determined. A backup request is generated including the configuration settings, the unique identifier, and a backup operation code. The backup request is broadcasted on the network to be received by the backup servers to store the configuration settings for the unique identifier.

In a further backup server embodiment, broadcasts of backup requests are received from network attached appliances in a network, wherein each of the backup requests includes a unique identifier and configuration settings of the network attached appliance broadcasting the backup request. For each of the received backup requests, the configuration settings in the backup request for the network attached appliance are stored and the stored configuration settings are associated with the unique identifier included in the backup request. A broadcast is received of a restore request including a restore unique identifier of one of the network attached appliances in the network. A determination is made as to whether one of the stored configuration settings is associated with the unique identifier matching the restore unique identifier. A restore reply is generated including the stored configuration settings associated with the unique identifier matching the restore unique identifier and the restore unique identifier in response to determining the stored configuration settings associated with the unique identifier match the restore unique identifier. The generated restore reply is broadcasted in the network to be received at a plurality of the network attached appliances including the network attached appliance having the restore unique identifier.

DETAILED DESCRIPTION

Devices and network attached appliances part of the Internet of Things may not be readily configured. Users may have difficulty remembering a particular configuration or the process to perform the configuration. Further, backup solutions that require communication with a pre-defined global backup server may not be suitable to store configuration settings for network attached appliances because the appliance manufacturer may not be able to provide long term commitments for server locations.

Described embodiments provide techniques for allowing network attached appliances, such as devices and objects of the Internet of Things, to backup and restore configuration settings by broadcasting backup and restore requests to backup servers in a network designed to accept backup and restore requests from different clients that adhere to a common backup and restore protocol. The backup and restore operations and communications among network attached appliances and backup servers may be session free, requiring no registration or authentication. The backup servers receiving the broadcasts may each independently backup configuration settings from the network attached appliances and provide configuration settings to restore requests from a network attached appliance. Because backup and restore requests are broadcasted to numerous backup servers independently providing the backup services, any of the backup servers that are available may respond to backup and restore requests for configuration settings when needed.

Figure 1:
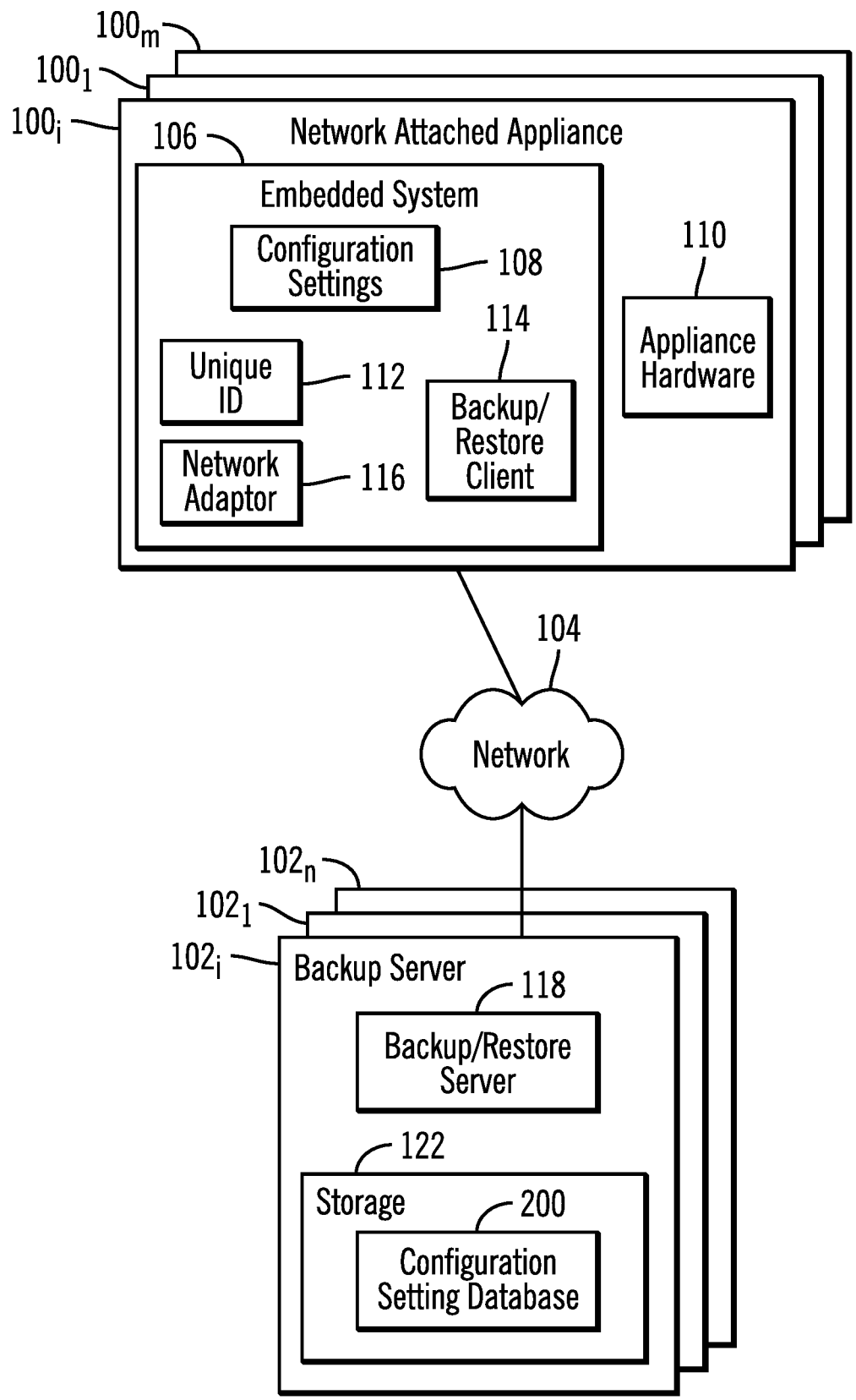
FIG. 1 illustrates an embodiment of a network environment including network attached appliances.

FIG. 1 illustrates an embodiment of a network computing environment having a plurality of network attached appliances $100_1$, $100_2$ . . . $100_m$ and backup servers $102_1$, $102_2$ . . . $102_n$ that communicate over a network 104. Each of the backup servers $102_1$, $102_2$ . . . $102_n$ may backup configuration settings in each of the network attached appliances $100_1$, $100_2$ . . . $100_m$. Each of the network attached appliances $100_1$, $100_2$ . . . $100_m$ include, as shown with respect to network attached appliance $100_i$, an embedded system 106 including configuration settings 108 used to configure appliance hardware 110, comprising the device specific hardware of the network attached appliance $100_i$; a unique identifier 112 of the network attached appliance $100_i$ to uniquely identify the network attached appliance $100_i$ in the network; a backup/restore client 114 to perform operations to backup and restore the configuration settings 108 with respect to the backup servers $102_1$, $102_2$ . . . $102_n$; and a network adaptor 116 to connect to the network 104. The network attached appliances $100_1$, $100_2$ ... $100_m$ may comprise any type of consumer or other device that may connect to a network 104. For instance the network attached appliances $100_1$, $100_2$ ... $100_m$ may comprise objects characterized as part of the Internet of Things, such as devices, vehicles, buildings, embedded with electronics, software sensors and network connectivity to allow those objects to communicate on the network 104.

The embedded system 106 may be implemented using a processor executing a computer program in a storage device, such as described with respect to FIG. 10. Alternatively, the embedded system 106 may be implemented in an application specific integrated circuit (ASIC), such as a system-on-a chip design.

Each of the backup servers $102_1$, $102_2$ ... $102_n$ include, as shown with respect to backup server $102_i$, a backup/restore server 118 and a configuration setting database 200 to store configuration settings broadcasted by the network attached appliances $100_1$, $100_2$ ... $100_m$.

The backup servers $102_1$, $102_2$ ... $102_n$ may store the configuration setting database 120 in a storage 122 comprising one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 104 may comprise a local area network (LAN), storage area network (SAN), wide area network (WAN), the Internet, an Intranet, etc.

In certain embodiments, the backup/restore client 114 and the backup/restore server 118 may operate according to a common Internet of Things protocol that all appliances and backup servers may utilize to provide common backup and recovery services. For instance, the manufacturers or distributors of the network attached appliances $100_1$, $100_2$ ... $100_m$ may contract with operators of backup servers $102_1$, $102_2$ ... $102_n$ who provide backup/restore services for network attached appliances $100_1$, $100_2$ ... $100_m$ of different types from different vendors so that the backup and restore services may be ubiquitous within the Internet of Things. Further, the backup and restore operations and communications among network attached appliances and backup servers may be session free, requiring no registration or authentication.

Figure 2:
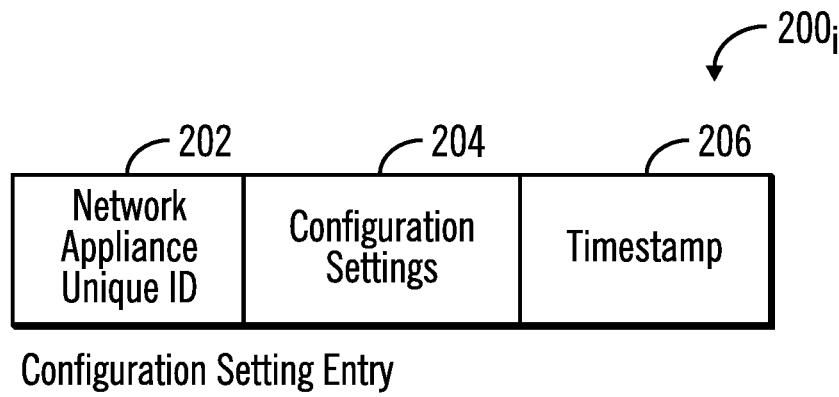
FIG. 2 illustrates an embodiment of a configuration setting entry in a configuration setting database.

FIG. 2 illustrates an embodiment of a configuration setting entry $200_i$ in the configuration setting database 200, such as a database record, for each configuration setting 108 communicated by the network attached appliances $100_1$, $100_2$ ... $100_m$, and includes a network attached appliance unique ID 202, which comprises the unique ID 112 of the network attached appliance $100_i$ providing the configuration setting 200 that is backed up, and a timestamp 206 of the backed-up configuration settings 200. The unique ID may comprise a MAC address, Internet Protocol (IP address), universally unique identifier (UUID), a device type, a serial number, etc. The unique ID may be defined by the user of the network attached appliance $100_1$, $100_2$ ... $100_m$.

Figure 3:
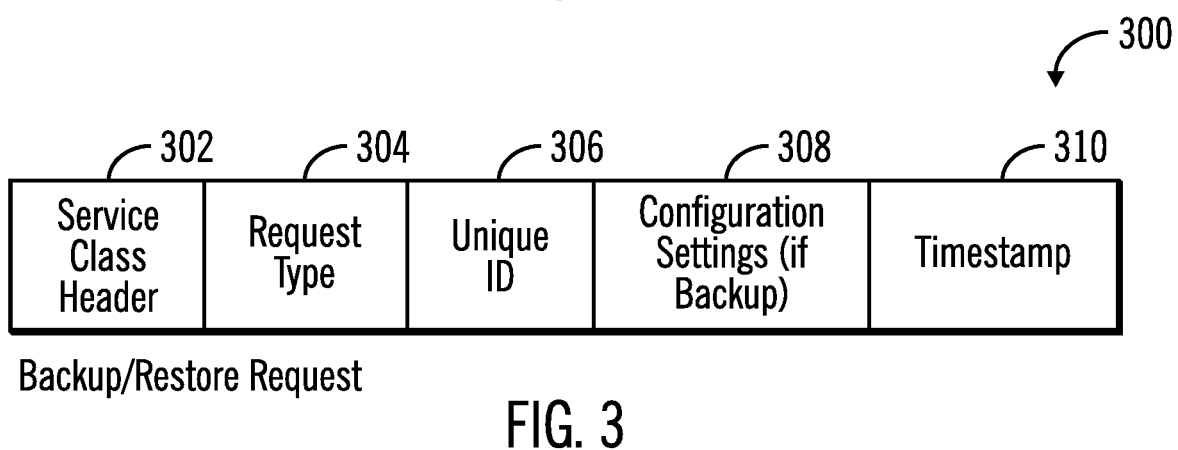
FIG. 3 illustrates an embodiment of a backup/restore request.

FIG. 3 illustrates an embodiment of a backup/restore request 300 generated by the backup/restore client 114 and communicated to the backup servers $102_1$, $102_2$ ... $102_n$, and includes a service class header 302 identifying a service class that indicates the request is part of a backup service, and devices, such as the backup servers $102_1$, $102_2$ ... $102_n$ and network attached appliances $100_1$, $100_2$ ... $100_m$, may listen for broadcasts having this service class associated with the backup service; a request type 304, such as backup or restore; a unique identifier 306 of the network attached appliance $100_1$, $100_2$ ... $100_m$ initiating the backup or restore request; configuration settings 308 at the network attached appliance $100_1$, $100_2$ ... $100_m$ identified by the unique ID 306 if the request type 304 is a backup request; and a timestamp 310 of the provided configuration settings 308. For a restore request to restore configuration settings, the request type 304 would indicate restore and there would be no configuration settings 308 nor timestamp 310 included.

With the backup request 300 of FIG. 3, the configuration settings to backup are tagged with the header and unique ID of the network attached appliance $100_1$, $100_2$ ... $100_m$ generating the backup request 300.

Figure 4:
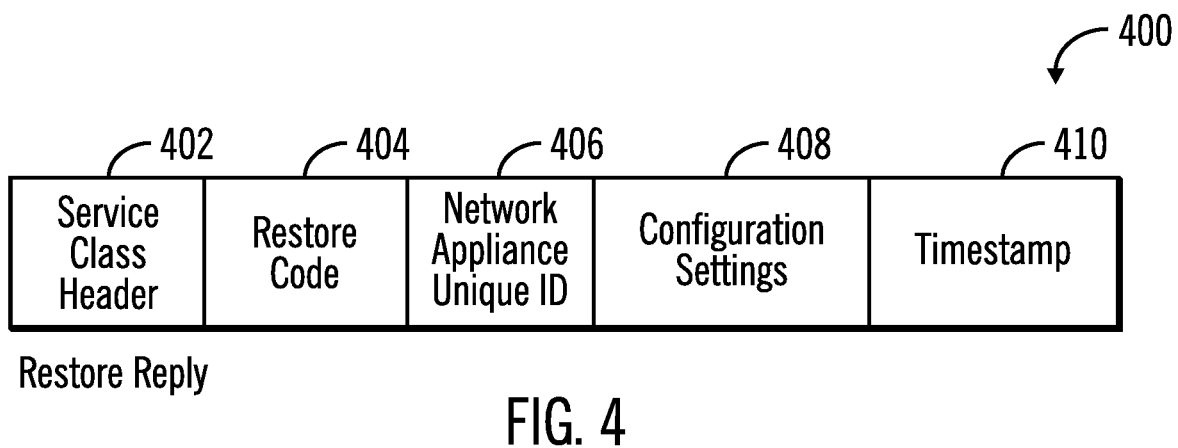
FIG. 4 illustrates an embodiment of a restore reply to a restore request.

FIG. 4 illustrates an embodiment of a restore reply 400 generated by the backup/restore server 118 in response to a restore request 300 from a network attached appliance $100_1$, $100_2$ ... $100_m$, and includes the service class header 402 used to identify those devices participating in the backup/restore services; a restore code 404 identifying the reply 400 as having information for a restore; a network attached appliance unique ID 406 of the network attached appliance $100_1$, $100_2$ ... $100_m$ that initiated the restore request; the configuration settings 408 to restore at the requesting network attached appliance $100_1$, $100_2$ ... $100_m$; and a timestamp 410 of the configuration settings 408.

Figure 5:
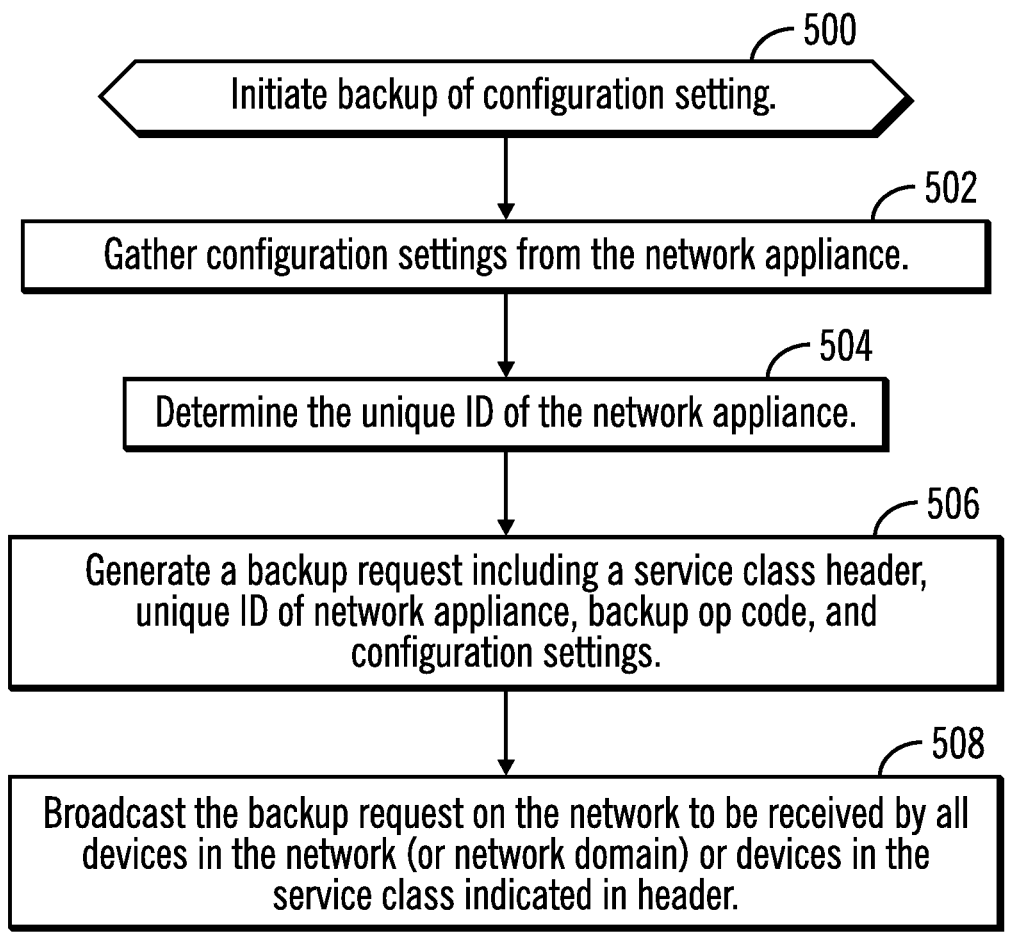
FIG. 5 illustrates an embodiment of operations for a network attached appliance to backup configuration settings in the network.

FIG. 5 illustrates an embodiment of operations the backup/restore client 114 in the network attached appliances $100_1$, $100_2$ ... $100_m$ performs to backup configuration settings 108 in the backup servers $102_1$, $102_2$ ... $102_n$. The operations of FIG. 5 may be periodically initiated at the network attached appliances $100_1$, $100_2$ ... $100_m$ to periodically backup the configuration settings 108. Upon initiating (at block 500) a backup of the configuration settings 108, configuration settings 108 are gathered (at block 502) at the network attached appliance $100_i$ and the unique ID 112 is determined (at block 504). A backup request $300_B$ is generated (at block 506) including a service class header 302, a backup request type 304, the determined unique ID 306, the gathered configuration settings 308, and the timestamp 310. The generated backup request $300_B$ is broadcasted (at block 508) through the network adaptor 116 to the backup servers $102_1$, $102_2$ ... $102_n$ in the network.

In one embodiment, the backup request $300_B$ may be broadcasted on the network 104 to be received by every device in the network 104. In a further embodiment, the backup request $300_B$ may be transmitted using different transmission protocols, such as a transmission to an addressed backup server or a multicast, so that devices in the network 104 that are members of the service class for backup services indicated in the service class header 302 would receive and process the backup request 300. Thus, in described embodiments, those devices, such as network attached appliances $100_1$, $100_2$ ... $100_m$ and backup servers $102_1$, $102_2$ ... $102_n$, participating in the backup/restore service class would receive and process backup requests $300_B$.

Figure 6:
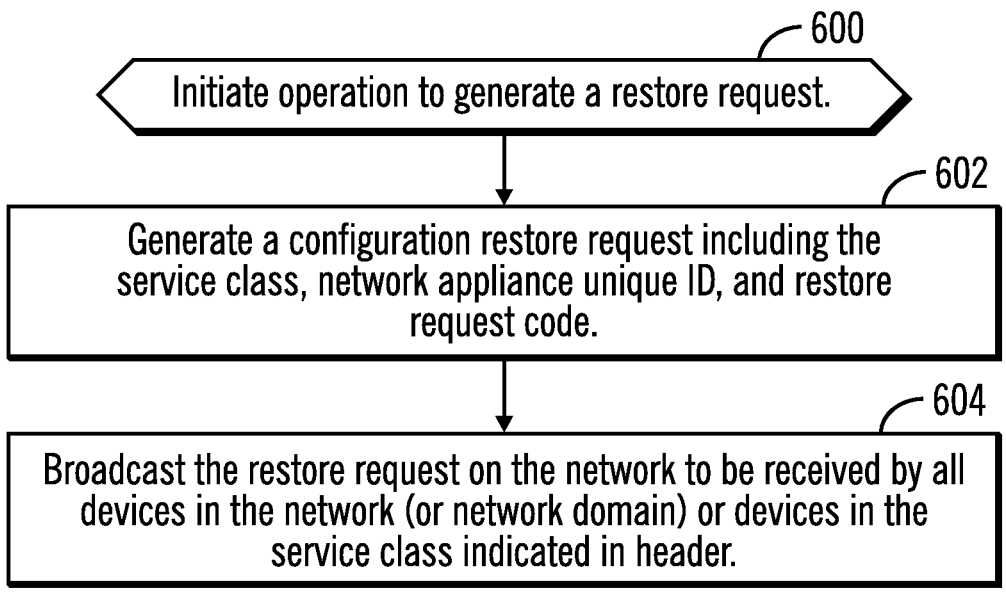
FIG. 6 illustrates an embodiment of operations for a network attached appliance to generate a restore request to restore configuration settings.

FIG. 6 illustrates an embodiment of operations the backup/restore client 114 in the network attached appliances $100_1$, $100_2$ ... $100_m$ performs to generate a restore request $300_R$. The restore request $300_R$ may be initiated by a user wanting to restore the configuration settings after a failure or upon replacing a network attached appliance $100_1$, $100_2$ ... $100_m$. Upon initiating (at block 600) the operation to generate a restore request, the backup/restore client 114 generates (at block 602) a configuration restore request $300_R$ including the service class 302, network attached appliance unique ID 306 of the network attached appliance $100_i$ wanting to restore its configuration settings, and a restore request code in the request type 304. The generated restore request $300_R$ is broadcasted (at block 604) through the network adaptor 116, which would reach the backup servers $102_1$, $102_2$ ... $102_n$ in the network 104 listening for such request. In this way, multiple of the backup servers $102_1$, $102_2$ ... $102_n$ may receive the restore request $300_R$, and the broadcasting network attached appliance $100_i$ is not aware of the backup servers $102_1$, $102_2$ ... $102_n$ that have received and backed-up the restore request $300_R$.

Figure 7:
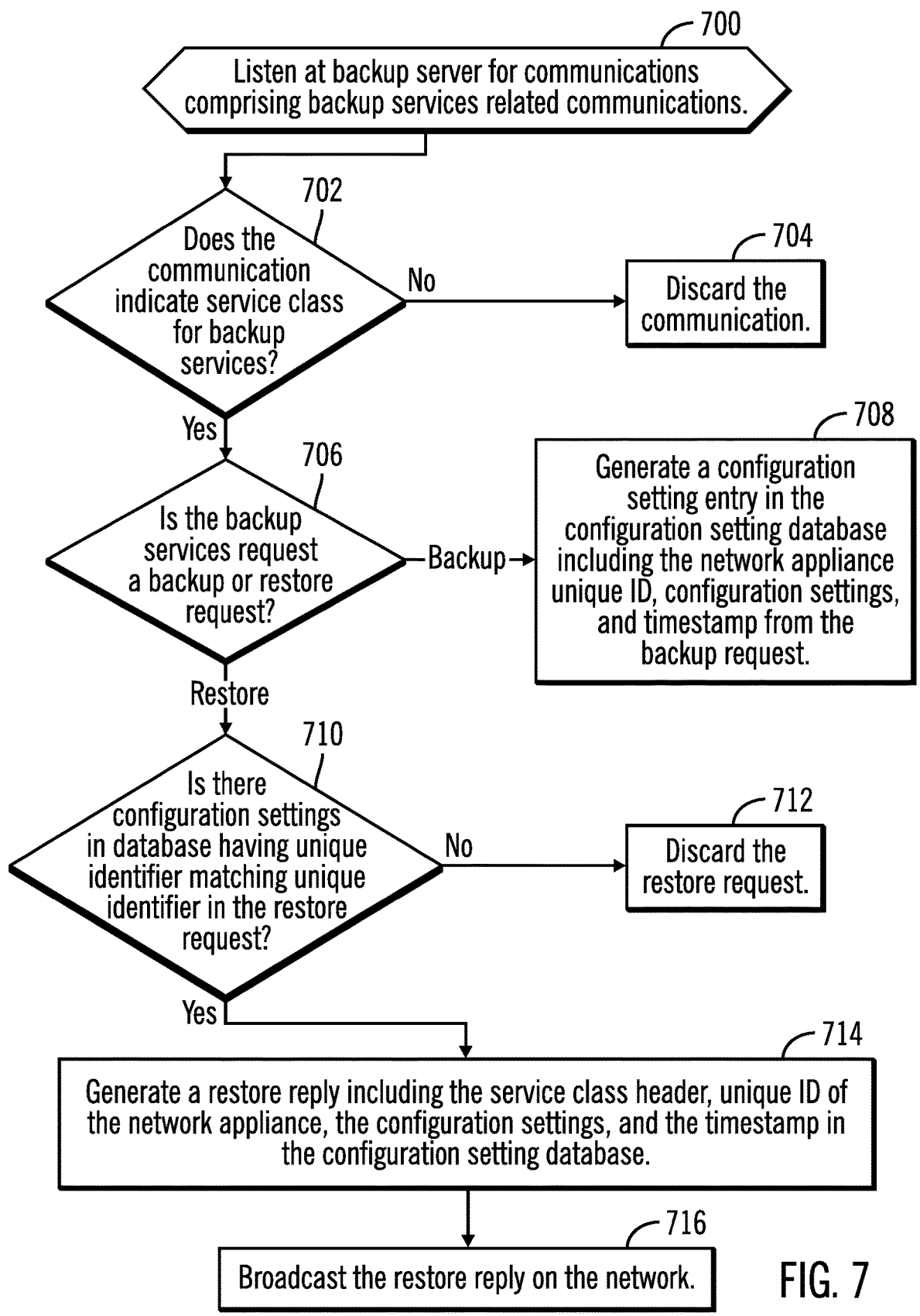
FIG. 7 illustrates an embodiment of operations for a backup server to process a backup or restore request from a network attached appliance.

FIG. 7 illustrates an embodiment of operations performed by the backup/restore server 118 executing in the backup servers $102_1$, $102_2$ ... $102_n$ to process requests from the network attached appliances $100_1$, $100_2$ ... $100_m$, including a backup request $300_B$ and restore request $300_R$. Multiple of the backup servers $102_1$, $102_2$ ... $102_n$ may process and perform backup and restore operations for one backup $300_B$ and restore $300_R$ request broadcasted from one of the network attached appliances $100_1$, $100_2$ ... $100_m$. The backup/restore server 118 may listen for broadcasts of backup and restore requests 300 from the network attached appliances $100_1$, $100_2$ ... $100_m$. Upon receiving (at block 700) a communication, if (at block 702) the communication does not indicate a service class 302 associated with backup services, i.e., does not comprise a backup $300_B$ or restore $300_R$ request, then the communication is discarded (at block 704) and not further processed. If (at block 702) the service class identified in the header 302 is associated with backup services, then the backup/restore server 118 determines (at block 706) whether the backup services request type 304 is a backup or restore request. If a backup request, then the backup/restore server 118 generates (at block 708) a configuration setting entry $200_i$ in the configuration setting database 200 including the network attached appliance unique ID 306, configuration settings 308, and timestamp 310 in the backup request 300 in fields 202, 204, and 206, respectively, to store in the configuration setting database 200.

If (at block 706), the backup services request is a restore request, as indicated in the request type 304, then the backup/restore server 118 determines (at block 710) whether there is a configuration settings entry $200_i$ in the database 200 having a unique identifier 202 that matches the unique identifier 306 in the restore request $300_R$. If (at block 710) there is no configuration setting entry $200_i$ for the unique identifier 306 in the restore request $300_R$, i.e., for the requesting network attached appliance $100_i$, then the restore request $300_R$ is discarded (at block 712).

If (at block 710) there is a configuration setting entry $200_i$ for the unique identifier 306 in the restore request $300_R$, then the backup/restore server 118 generates (at block 714) a restore reply 400 including the service class header 402 indicating backup services, the restore code 404; and in fields 406, 408, and 410 the unique network attached appliance ID 202, 306 in the configuration setting entry $200_i$ and restore request $300_R$, the configuration settings 204, and the timestamp 206 in the configuration setting entry $200_i$ in the configuration setting database 200. The generated restore reply 400 is broadcasted (at block 716) to the devices in the network, including the network attached appliances $100_1$, $100_2$ ... $100_m$, in the network 104. In this way, multiple of the network attached appliances $100_1$, $100_2$ ... $100_m$ may receive the restore reply 400, and the broadcasting backup server $102_i$ is not aware of the different network attached appliances $100_1$, $100_2$ ... $100_m$ that will receive and process the restore reply 400.

With the operations of FIG. 7, each of the backup servers $102_1$, $102_2$ ... $102_n$ may independently listen for backup $300_B$ and restore $300_R$ requests and store the configuration settings broadcasted from multiple of the network attached appliances $100_1$, $100_2$ ... $100_m$ in backup requests 300 that are broadcasted to all the backup servers $102_1$, $102_2$ ... $102_n$ that are intended to receive the backup requests $300_B$, such as in the same service class. In this way, the network attached appliances $100_1$, $100_2$ ... $100_m$ are not aware of which backup servers $102_1$, $102_2$ ... $102_n$ in the network 104 received and stored the configuration settings 108. Further, when broadcasting a restore request $300_R$, the backup servers $102_1$, $102_2$ ... $102_n$ are not aware of the network attached appliances $100_1$, $100_2$ ... $100_m$ that have received the restore reply 400 and applied the configuration settings 409.

Figure 8:
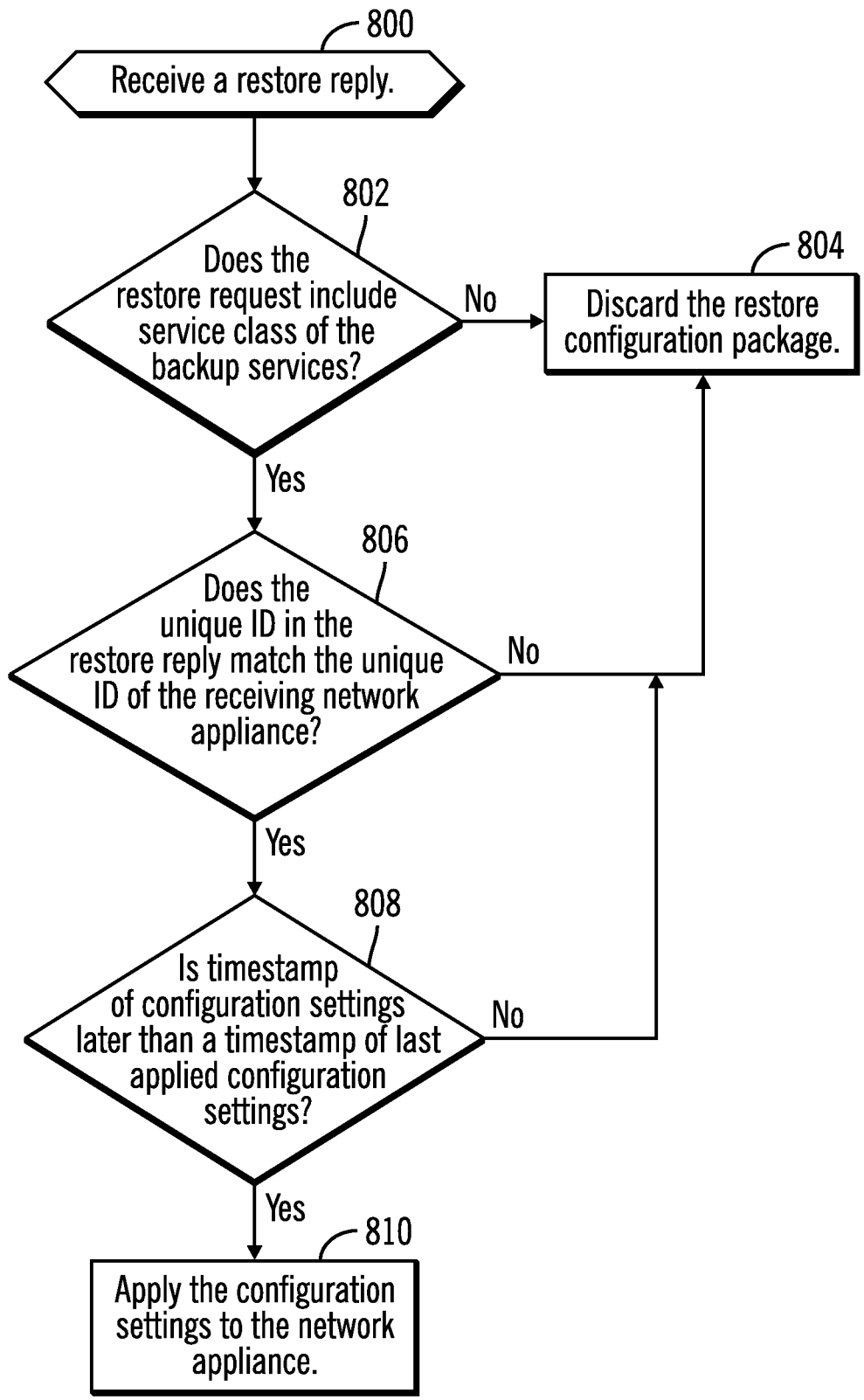
FIG. 8 illustrates an embodiment of operations for a network attached appliance to process a restore reply to a restore request.

FIG. 8 illustrates an embodiment of operations performed by the backup/restore client 114 in the network attached appliances $100_1$, $100_2$ ... $100_m$ to process a received restore reply 400 from one of the backup servers $102_1$, $102_2$ ... $102_n$. The backup/restore client 114 may listen for broadcasts of restore replies 400 from backup servers in the network 104. Since each of the backup servers may independently respond to a restore request $300_R$, the network attached appliances $100_1$, $100_2$ ... $100_m$ may receive multiple restore replies 400 from the backup servers $102_1$, $102_2$ ... $102_n$ for the same restore request $300_R$. Upon receiving (at block 800) the restore reply 400, if (at block 802) the service class header 402 in the restore reply 400 does not indicate the service class associated with the backup services, then the restore reply 400 is discarded (at block 804) and not further processed. If (at block 802) the service class identified in the header 402 is associated with the backup services, then the backup/restore client 114 determines (at block 806) whether the unique ID 406 in the restore reply 400 matches the unique ID 112 of the receiving network attached appliance $100_i$. If (at block 806) there is not a match, then control proceeds to block 904 to discard the restore reply 400, because it is intended for a different network attached appliance. If (at block 806) there is a match and the restore reply 400 is intended for the receiving network attached appliance $100_i$, then a determination is made (at block 808) whether the timestamp 410 for the configuration settings 408 in the restore reply 400 is greater than the timestamp of the last applied configuration settings 108 in the network attached appliance $100_i$. If (at block 808) the timestamp is not greater, meaning the current installed configuration settings 108 are current, then control proceeds to block 904 to discard the restore reply 400. If (at block 808) the timestamp 410 indicates the configuration settings 408 are more current than the currently installed configuration settings 108, then the configuration settings 408 are applied (at block 810) to the network attached appliance $100_i$. If there are no installed valid configuration settings 108, such as if the configuration settings 108 have been corrupted, then the configuration settings 408 in the restore reply 400 are automatically applied.

The operations to apply the configuration settings 408 at block 808 may be alternatively performed by applying the configuration settings 408 in the first received restore reply 400$_1$, and then discarding any subsequently received restore replies.

With the operations of FIG. 8, the backup/restore client 114 may process restore replies 400 from multiple backup servers 102$_1$, 102$_2$ . . . 102$_n$ responding to the same broadcasted restore request 300$_R$.

Described embodiments provide techniques for an embedded backup/restore system in network attached appliances to backup and restore configuration settings to multiple backup servers in the network, such that a single backup and restore may be broadcasted to multiple of the backup servers on the network to independently process. Each of the backup servers may independently store configuration settings for each of the network attached appliances to provide redundancy in the storage of the configuration settings. The embedded system of the described embodiments may thus broadcast backup and restore requests without being aware which of the one or more backup servers will process, and thus be able to process multiple responses to a single restore request from the different backup servers in the network that may simultaneously receive backup and restore requests from the network attached appliances. The backup and restore operations and communications among network attached appliances and backup servers may be session free, requiring no registration or authentication.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

Figure 9:
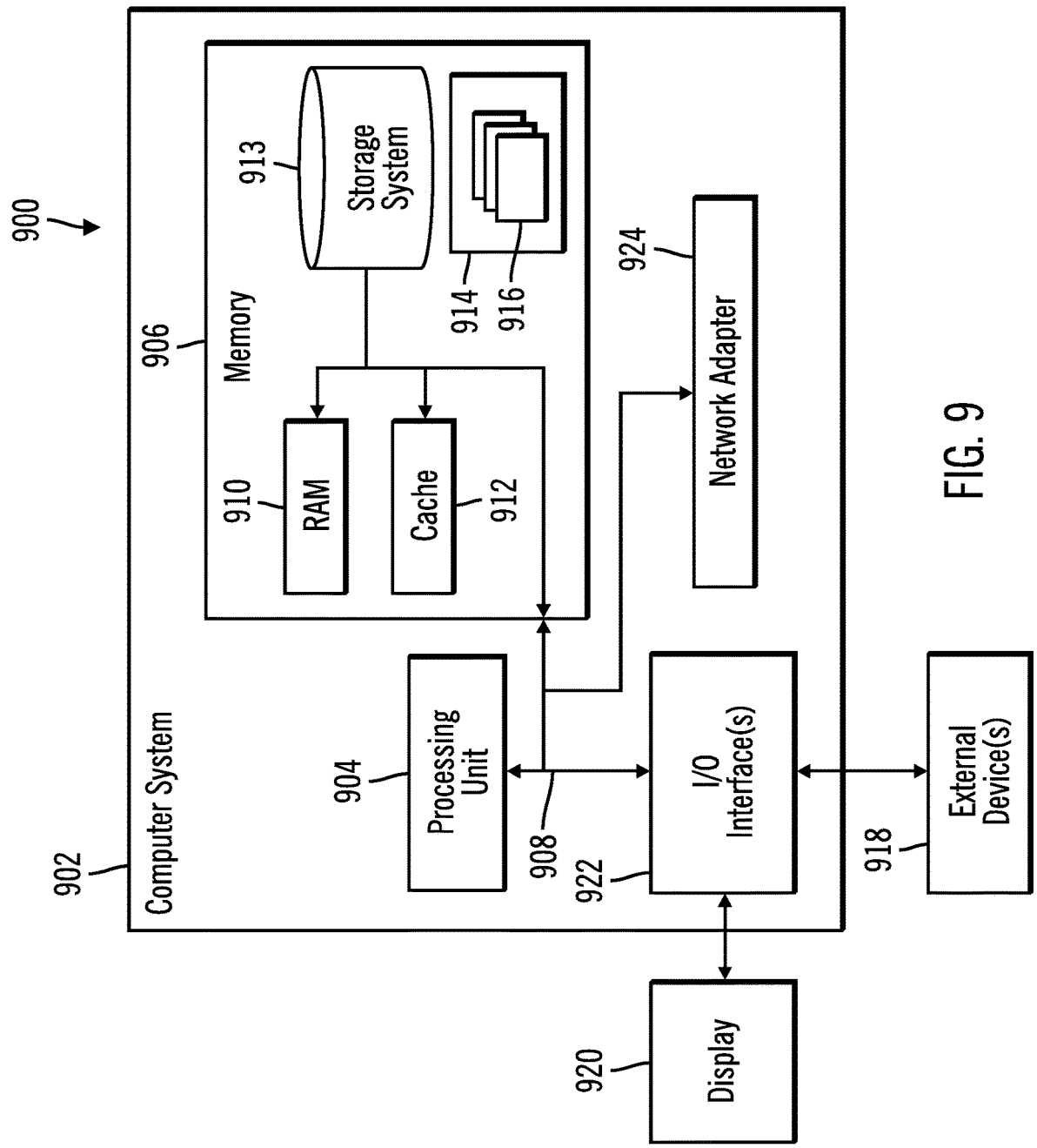
FIG. 9 illustrates a computing environment in which the components of FIG. 1 may be implemented.

The computational components of FIG. 1 including the network attached appliances $100_1, 100_2 \ldots 100_m$ and backup servers $102_1, 102_2 \ldots 102_n$ may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components may be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for backing-up and restoring configuration settings in network attached appliances in a network, the computer program product comprising a computer readable storage medium having computer readable program code to perform operations, the operations comprising:
   receiving broadcasts of backup requests from the network attached appliances in the network, wherein the backup requests include unique identifiers and configuration settings of the network attached appliances broadcasting the backup requests;
   storing the configuration settings in the backup requests and associating the stored configuration settings with the unique identifiers included in the backup requests;
   receiving a broadcast of a restore request including a restore unique identifier of one of the network attached appliances in the network;
   determining stored configuration settings for one of the backup requests associated with a unique identifier matching the restore unique identifier;
   generating a restore reply including the determined stored configuration settings in response to determining the stored configuration settings associated with the unique identifier matching the restore unique identifier; and
   broadcasting the generated restore reply in the network to be received at a plurality of the network attached appliances including the network attached appliance having the restore unique identifier.

2. The computer program product of claim 1, wherein the backup requests include timestamps of the configuration settings, wherein the operations further comprise:
   associating the timestamps in the backup requests with the stored configuration settings, wherein the restore reply includes a timestamp of the configuration settings included in the restore reply.

3. The computer program product of claim 1, wherein the operations further comprise:
   discarding the restore request without replying to the restore request in response to determining that there are no stored configuration settings associated with the unique identifier matching the restore unique identifier.

4. The computer program product of claim 1, wherein the operations further comprise:
   listening for broadcasts having a specified service class, wherein the received broadcasts that are processed comprise the backup requests indicating the specified service class.

5. A system for backing-up and restoring configuration settings in network attached appliances in a network, comprising:
   a processor; and
   a computer readable storage medium having computer readable program code, the operations comprising:
      receiving broadcasts of backup requests from the network attached appliances in the network, wherein the backup requests unique identifiers and configuration settings of the network attached appliances broadcasting the backup requests;
      storing the configuration settings in the backup requests and associating the stored configuration settings with the unique identifiers included in the backup requests;
      receiving a broadcast of a restore request including a restore unique identifier of one of the network attached appliances in the network;
      determining stored configuration settings for one of the backup requests associated with a unique identifier matching the restore unique identifier;
      generating a restore reply including the determined stored configuration settings in response to determining the stored configuration settings associated with the unique identifier matching the restore unique identifier; and
      broadcasting the generated restore reply in the network to be received at a plurality of the network attached appliances including the network attached appliance having the restore unique identifier.

6. The system of claim 5, wherein the operations further comprise:
   discarding the restore request without replying to the restore request in response to determining that there are no stored configuration settings associated with the unique identifier matching the restore unique identifier.

7. The system of claim 5, wherein the operations further comprise:
   listening for broadcasts having a specified service class, wherein the received broadcasts that are processed comprise the backup requests indicating the specified service class.

8. The system of claim 5, wherein the backup requests include timestamps of the configuration settings, wherein the operations further comprise:

associating the timestamps in the backup requests with the stored configuration settings, wherein the restore reply includes a timestamp of the configuration settings included in the restore reply.

9. A method for backing-up configuration settings in a server, comprising:
   receiving broadcasts of backup requests from network attached appliances in a network, wherein the backup requests include unique identifiers and configuration settings of the network attached appliances broadcasting the backup requests;
   storing the configuration settings in the backup requests and associating the stored configuration settings with the unique identifiers included in the backup requests;
   receiving a broadcast of a restore request including a restore unique identifier of one of the network attached appliances in the network;
   determining stored configuration settings for one of the backup requests associated with a unique identifier matching the restore unique identifier;
   generating a restore reply including the determined stored configuration settings in response to determining the stored configuration settings associated with the unique identifier matching the restore unique identifier; and
   broadcasting the generated restore reply in the network to be received at a plurality of the network attached appliances including the network attached appliance having the restore unique identifier.

10. The method of claim 9, wherein the operations further comprise:
   discarding the restore request without replying to the restore request in response to determining that there are no stored configuration settings associated with the unique identifier matching the restore unique identifier.

11. The method of claim 9, wherein the operations further comprise:
   listening for broadcasts having a specified service class, wherein the received broadcasts that are processed comprise the backup requests indicating the specified service class.

12. The method of claim 9, wherein the backup requests include timestamps of the configuration settings, wherein the operations further comprise:
   associating the timestamps in the backup requests with the stored configuration settings, wherein the restore reply includes a timestamp of the configuration settings included in the restore reply.

\* \* \* \* \*